US011185820B2

(12) United States Patent
Schoenhaber et al.

(10) Patent No.: US 11,185,820 B2
(45) Date of Patent: Nov. 30, 2021

(54) MULTI-LAYER THREE-WAY CATALYTIC CONVERTER

(71) Applicant: UMICORE AG & CO. KG, Hanau-Wolfgang (DE)

(72) Inventors: Jan Schoenhaber, Darmstadt (DE); Martin Roesch, Rodgau (DE); Joerg-Michael Richter, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/954,628

(22) PCT Filed: Dec. 19, 2018

(86) PCT No.: PCT/EP2018/085961
§ 371 (c)(1),
(2) Date: Jun. 17, 2020

(87) PCT Pub. No.: WO2019/121994
PCT Pub. Date: Jun. 27, 2019

(65) Prior Publication Data
US 2020/0306693 A1 Oct. 1, 2020

(30) Foreign Application Priority Data

Dec. 19, 2017 (EP) .................................. 17208615

(51) Int. Cl.
*B01D 53/94* (2006.01)
*B01J 23/63* (2006.01)
*B01J 35/00* (2006.01)
*B01J 35/04* (2006.01)
*F01N 3/10* (2006.01)
*F01N 3/28* (2006.01)
*B01J 23/10* (2006.01)
*B01J 23/46* (2006.01)
*B01J 21/06* (2006.01)
*F01N 3/035* (2006.01)

(52) U.S. Cl.
CPC ....... *B01D 53/945* (2013.01); *B01D 53/9468* (2013.01); *B01J 21/066* (2013.01); *B01J 23/10* (2013.01); *B01J 23/464* (2013.01); *B01J 23/63* (2013.01); *B01J 35/0006* (2013.01); *B01J 35/04* (2013.01); *F01N 3/035* (2013.01); *F01N 3/101* (2013.01); *F01N 3/28* (2013.01); *F01N 3/2825* (2013.01); *B01D 2255/1021* (2013.01); *B01D 2255/1023* (2013.01); *B01D 2255/1025* (2013.01); *B01D 2255/2061* (2013.01); *B01D 2255/2063* (2013.01); *B01D 2255/2065* (2013.01); *B01D 2255/2066* (2013.01); *B01D 2255/2092* (2013.01); *B01D 2255/20715* (2013.01); *B01D 2255/407* (2013.01); *B01D 2255/908* (2013.01); *B01D 2255/9022* (2013.01); *B01D 2255/9155* (2013.01); *B01D 2258/014* (2013.01); *F01N 2330/06* (2013.01); *F01N 2330/30* (2013.01); *F01N 2370/02* (2013.01); *F01N 2510/06* (2013.01); *F01N 2510/0684* (2013.01)

(58) Field of Classification Search
CPC ............ B01D 46/2418; B01D 53/9445; B01D 53/945; B01D 53/9468; B01D 2255/102; B01D 2255/2061; B01D 2255/2065; B01D 2255/407; B01D 2255/9022; B01D 2255/908; B01D 2255/9155; B01D 2258/014; F01N 3/035; F01N 3/101; F01N 2250/02; B01J 23/10; B01J 23/40
See application file for complete search history.

(56) References Cited

U.S. PATENT DOCUMENTS

| 6,228,799 | B1 | 5/2001 | Aubert et al. |
| 6,294,140 | B1 * | 9/2001 | Mussmann .............. B01J 35/04 423/213.5 |
| 6,348,430 | B1 * | 2/2002 | Lindner ............... B01J 37/0244 502/304 |
| 7,964,527 | B2 | 6/2011 | Larcher et al. |
| 8,007,750 | B2 * | 8/2011 | Chen ........................ B01J 23/40 423/239.1 |
| 8,066,963 | B2 | 11/2011 | Klingmann et al. |
| 8,397,488 | B2 | 3/2013 | Woerz et al. |
| 8,640,440 | B2 | 2/2014 | Klingmann et al. |
| 8,663,588 | B2 | 3/2014 | Lindner et al. |
| 8,956,994 | B2 | 2/2015 | Ifrah et al. |

(Continued)

FOREIGN PATENT DOCUMENTS

| CN | 100427205 C | 10/2008 |
| CN | 104785257 | 7/2015 |

(Continued)

OTHER PUBLICATIONS

International Search Report for PCT/EP2018/085961, dated Feb. 11, 2019 (5 pgs. with English translation).

(Continued)

*Primary Examiner* — Timothy C Vanoy

(74) *Attorney, Agent, or Firm* — Smith, Gambrell & Russell, LLP

(57) ABSTRACT

The invention relates to a three-way catalytic converter, which is suitable, in particular, for the removal of carbon monoxide, hydrocarbons and nitrogen oxides out of the exhaust gas of combustion engines operated with stoichiometric air-fuel mixture. The three-way catalytic converter is characterized in that it has a high oxygen storage capacity after aging and consists of at least two catalytically active layers.

18 Claims, No Drawings

(56) References Cited

U.S. PATENT DOCUMENTS

| | | |
|---|---|---|
| 9,156,023 B2 | 10/2015 | Klingmann et al. |
| 9,174,198 B2 | 11/2015 | Kawabata et al. |
| 9,238,982 B2 | 1/2016 | Springer et al. |
| 9,266,092 B2 | 2/2016 | Arnold et al. |
| 9,517,462 B2 | 12/2016 | Roesch et al. |
| 10,413,886 B2 | 9/2019 | Despres et al. |
| 2004/0065078 A1 | 4/2004 | Schafer-Sindlinger et al. |
| 2007/0093381 A1 | 4/2007 | Miyoshi et al. |
| 2008/0090723 A1 | 4/2008 | Okamoto et al. |
| 2010/0055012 A1 | 3/2010 | Grisstede et al. |
| 2010/0275579 A1 | 11/2010 | Klingmann et al. |
| 2010/0319332 A1 | 12/2010 | Jeske et al. |
| 2011/0094207 A1 | 4/2011 | Woerz et al. |
| 2013/0143732 A1 | 6/2013 | Aoki |
| 2014/0140899 A1 | 5/2014 | Gabrielsson et al. |
| 2017/0304773 A1 | 10/2017 | Onoe et al. |
| 2017/0368536 A1 | 12/2017 | Depres et al. |
| 2018/0178198 A1 | 6/2018 | Deeba et al. |
| 2020/0094189 A1 | 3/2020 | Deibel et al. |
| 2020/0188887 A1* | 6/2020 | Kobayashi ............... B01J 23/02 |
| 2020/0316565 A1 | 10/2020 | Fisher et al. |
| 2021/0008613 A1 | 3/2021 | Schoenhaber et al. |
| 2021/0069678 A1 | 3/2021 | Schoenhaber et al. |
| 2021/0079822 A1 | 3/2021 | Schoenhaber et al. |

FOREIGN PATENT DOCUMENTS

| | | |
|---|---|---|
| DE | 10 2011 050 788 A1 | 12/2012 |
| DE | 11 2013 002 163 T5 | 1/2015 |
| EP | 0 885 650 A2 | 12/1998 |
| EP | 1 046 423 A2 | 10/2000 |
| EP | 1 657 410 A2 | 5/2006 |
| EP | 1 726 359 A1 | 11/2006 |
| EP | 1 974 809 A1 | 10/2008 |
| EP | 2 042 225 A1 | 4/2009 |
| EP | 2 042 226 A2 | 4/2009 |
| EP | 1 974 810 B1 | 8/2010 |
| EP | 2 322 773 A1 | 5/2011 |
| EP | 2 650 042 A1 | 10/2013 |
| EP | 2 948 653 A1 | 12/2015 |
| EP | 3 045 226 | 7/2016 |
| EP | 3 162 428 A1 | 5/2017 |
| EP | 3 205 388 A1 | 8/2017 |
| EP | 3 207 977 A1 | 8/2017 |
| EP | 3 207 978 A1 | 8/2017 |
| EP | 3 207 987 A1 | 8/2017 |
| EP | 3 207 989 A1 | 8/2017 |
| EP | 3 207 990 A1 | 8/2017 |
| EP | 3 247 493 A1 | 11/2017 |
| FR | 3 020 091 A1 | 10/2015 |
| JP | 2016-203116 A | 12/2016 |
| JP | 3 406 322 A1 | 11/2018 |
| PA | 1 541 220 B1 | 2/2014 |
| WO | 95/35152 A1 | 12/1995 |
| WO | 2008/000449 A2 | 1/2008 |
| WO | 2014/178633 A1 | 11/2014 |
| WO | 2017/109514 A1 | 6/2017 |
| WO | 2017/209083 A1 | 12/2017 |

OTHER PUBLICATIONS

Written Opinion of the International Searching Authority for PCT/EP2018/085961, dated Feb. 11, 2019 (6 pgs.).

Wikipedia https://de.wikipedia.org/wiki/Partikelgr%C3%B6%C3%9Fenverteilung "Partikelgrößenverteilung (Particle Size Distribution)" (14 pgs. with English Translation).

DIN 66132: Bestimmung der spezifischen Oberfläche von Feststoffen durch Stickstoffadsorption; Einpunkt-Differenzverfahren nach Haul und Dümbgen.[Determination of specific surface area of solids by adsorption of nitrogen; single-point differential method according to Haul and Dümbgen.] Standard by Deutsches Institut Fur Normung E. V. [German National Standard], 1975. 5 pages in German (with English machine translation).

International Preliminary Report on Patentability dated Jun. 23, 2020 for International Patent Application No. PCT/EP2018/085961 (7 pages in German with English translation).

European Search Report dated Jun. 4, 2018 for European Application No. 17208615.9 (8 pages).

Von Johann Siebler, et al. MTZ Motortechnische Zeitschrift [Katalysatorprüfung] 1994, 55, pp. 214-218.

Non Final Office Action dated Jun. 18, 2021 in U.S. Appl. No. 16/954,305 (8 pages).

Non Final Office Action dated May 28, 2021 in U.S. Appl. No. 16/954,323 (24 pages).

* cited by examiner

MULTI-LAYER THREE-WAY CATALYTIC CONVERTER

The present invention relates to a three-way catalytic converter that is particularly suitable for removing carbon monoxide, hydrocarbons and nitrogen oxides out of the exhaust gas of combustion engines operated with stoichiometric air-fuel mixture. It is characterized in that it has a high oxygen storage capacity after aging and consists of at least two catalytically active layers.

Exhaust gases from combustion engines, i.e., gasoline- or natural gas-fueled engines, operated with stoichiometric air-fuel mixtures are cleaned in conventional methods with the aid of three-way catalytic converters. Such catalytic converters are capable of simultaneously converting the three major gaseous pollutants of the engine, namely hydrocarbons, carbon monoxide and nitrogen oxides, into harmless components. Stoichiometrically means that on average exactly as much air is available for combustion of the fuel present in the cylinder as is required for complete combustion. The combustion air ratio λ (A/F ratio; air/fuel ratio) sets the air mass $m_{L,actual}$ which is actually available for combustion in relation to the stoichiometric air mass $m_{L,st}$:

$$\lambda = \frac{m_{L,actual}}{m_{L,st}}$$

If λ<1 (e.g., 0.9), this means "air deficiency" and one speaks of a rich exhaust gas mixture; λ>1 (e.g., 1.1) means "excess air" and the exhaust gas mixture is referred to as lean. The statement λ=1.1 means that 10% more air is present than would be required for the stoichiometric reaction.

In general, platinum group metals are used as catalytically active materials, particularly, platinum, palladium, and rhodium, which are, for example, present on γ aluminum oxide as support material. In addition, three-way catalytic converters contain oxygen-storing materials, e.g., cerium/zirconium mixed oxides. In the latter case, cerium oxide, a rare earth metal oxide, constitutes the component that is fundamental to the oxygen storage. Along with zirconium oxide and cerium oxide, these materials may contain additional components, such as further rare earth metal oxides or alkaline earth metal oxides. Oxygen-storing materials are activated by applying catalytically active materials, such as platinum group metals, and therefore also serve as support material for the platinum group metals.

The components of a three-way catalytic converter may be present in a single coating layer on an inert catalyst support. Such catalytic converters are distinguished by lower coating costs compared to multilayer catalytic converters.

EP1541220B1 describes a monolayer three-way catalytic converter in which palladium and rhodium are predominantly present in a non-alloyed form.

EP1974810B1 describes a monolayer three-way catalytic converter in which a first cerium/zirconium mixed oxide is activated with rhodium and a second cerium/zirconium mixed oxide is activated with palladium, the first cerium/zirconium mixed oxide having a higher zirconium oxide content than the second.

EP2948653A1 describes a monolayer three-way catalytic converter in which a temperature-resistant metal oxide and optionally a first cerium/zirconium mixed oxide is activated with rhodium and a second cerium/zirconium mixed oxide is activated with palladium, the proportion of cerium/zirconium mixed oxides in the layer being the same or greater than that of the temperature-resistant metal oxide in the layer.

Frequently used, however, are double-layer catalysts, which facilitate a separation of different catalytic processes and, therefore, enable an optimal coordination of the catalytic effects in the two layers. This frequently brings about a higher aging stability of the multilayer catalytic converters in comparison with monolayer catalytic converters. Catalytic converters of the latter type are disclosed, for example, in WO9535152A1, WO2008000449A2, EP0885650A2, EP1046423A2, EP1726359A1 and EP1974809A1.

EP1974809A1 discloses double-layer, three-way catalytic converters that contain cerium/zirconium mixed oxides in both layers, wherein the cerium/zirconium mixed oxide in the top layer respectively has a higher proportion of zirconium than that in the bottom layer.

EP1726359A1 describes double-layer, three-way catalysts that, in both layers, contain cerium/zirconium/lanthanum/neodymium mixed oxides with a zirconium content of more than 80 mol %, wherein the cerium/zirconium/lanthanum/neodymium mixed oxide in the top layer may respectively have a higher proportion of zirconium than that in the bottom layer.

WO2008000449A2 also discloses double-layer catalytic converters that contain cerium/zirconium mixed oxides in both layers, and wherein the mixed oxide in the top layer again has a higher proportion of zirconium. To some extent, the cerium/zirconium mixed oxides may also be replaced by cerium/zirconium/lanthanum/neodymium mixed oxides or cerium/zirconium/lanthanum/yttrium mixed oxides.

Three-way catalytic converters known from the prior art have a certain oxygen storage capacity after aging. Known compositions of three-way catalytic converters are described, for example, in EP3045226A1 and EP3247493A1. These exhibit very low emissions in modern vehicles with direct gasoline injection, Surprisingly, it has been found that in vehicles with intake manifold injection, three-way catalytic converters have particularly low emissions, which are distinguished by a high static oxygen storage capacity.

The present invention relates to a three-way catalytic converter with increased oxygen storage capacity and improved emissions, in particular in vehicles with intake manifold injection, comprising two layers on an inert catalyst support, wherein a layer A contains at least one active aluminum oxide, one platinum group metal, and at least two different cerium/zirconium/rare earth metal mixed oxides, and a layer B applied to layer A contains at least one active aluminum oxide, one platinum group metal, as well as at least one cerium/zirconium/rare earth metal mixed oxide.

Surprisingly, it has been found that a combination of different cerium/zirconium/rare earth metal mixed oxides in one coating can bring about a greatly improved conversion of gaseous pollutants after hard aging.

In a preferred embodiment, coating A is on the walls of the substrate. Furthermore, it is preferred if coating A extends from one end of the substrate over at least 50% of the length L. The catalytically active coating is located on the walls in the channels of the flow substrate. If, in the context of the present invention, a coating on the walls is mentioned, this means that only a small proportion of the coating of at most 20% by weight, more preferably at most 15% by weight and very particularly preferably at most 10% by weight, and most preferably at most 5% by weight is present in the walls of the flow substrate. This can be determined by graphical analysis of SEM cross-sectional images. According to the present invention, the coating extends from the first end of the ceramic honeycomb body over at least 50%, preferably at least 70% and very preferably 100% of the length L of the substrate.

Coating B is located at least partially on coating A. In a preferred embodiment, coating B covers coating A at least 50%, preferably at least 70% and very preferably 100%.

Coating A is catalytically active, in particular at operating temperatures of 250° C. to 1100° C. It usually contains one or more precious metals which are fixed on one or more support materials and two oxygen storage components which differ from one another. The oxygen storage components differ with respect to at least one of the components contained. Equal components of the oxygen storage materials may be present in equal or different amounts.

Coating B is catalytically active, in particular at operating temperatures of 250° C. to 1100° C. It usually contains one or more precious metals which are fixed on one or more support materials and at least one oxygen storage component.

Cerium/zirconium/rare earth metal mixed oxides are suitable as oxygen storage components. The term "cerium/zirconium/rare earth metal mixed oxide" within the meaning of the present invention excludes physical mixtures of cerium oxide, zirconium oxide and rare earth oxide. Rather, "cerium/zirconium/rare earth metal mixed oxides" are characterized by a largely homogeneous, three-dimensional crystal structure that is ideally free of phases of pure cerium oxide, zirconium oxide or rare earth oxide. Depending on the manufacturing process, however, not completely homogeneous products which have however a homogeneity of >80% by weight may arise which can generally be used without any disadvantage. In all other respects, the term "rare earth metal" or "rare earth metal oxide" within the meaning of the present invention does not include cerium or cerium oxide.

Lanthanum oxide, yttrium oxide, praseodymium oxide, neodymium oxide and/or samarium oxide can, for example, be considered as rare earth metal oxides in the cerium/zirconium/rare earth metal mixed oxides.
Lanthanum oxide, yttrium oxide, and/or praseodymium oxide are preferred, and lanthanum oxide and yttrium oxide, yttrium oxide and praseodymium oxide, and lanthanum oxide and praseodymium oxide are very particularly preferred.
In embodiments of the present invention, the oxygen storage components are preferably free from neodymium oxide.

In embodiments of the present invention, in coating A, the weight ratio of aluminum oxide to the sum of the two cerium/zirconium/rare earth metal mixed oxides is in the range from 10:90 to 60:40, preferably in the range from 20:80 to 50:50 and particularly preferably in the range from 25:75 to 35:65.

In preferred embodiments, coatings A and/or B comprise in each case lanthanum-stabilized aluminum oxide in amounts of 10 to 60% by weight, preferably 20 to 50% by weight, particularly preferably 25 to 35% by weight, and oxygen storage components in amounts of 40 to 90% by weight, preferably 50 to 80% by weight, particularly preferably 65 to 75% by weight, in each case based on the sum of the weights of aluminum oxide and oxygen storage components in the coating.

In a preferred embodiment, the proportion of cerium/zirconium/rare earth metal mixed oxides in layer A is greater than the proportion of cerium/zirconium/rare earth metal mixed oxide in layer B, calculated in % by weight in each case and based on the total weight of the respective layer. In embodiments, coating A comprises two oxygen storage components different from one another, wherein the weight ratio of the first cerium/zirconium/rare earth metal mixed oxide to the second cerium/zirconium/rare earth metal mixed oxide is preferably in the range from 4:1 to 1:4, preferably in the range from 3:1 to 1:3 and particularly preferably in the range from 2:1 to 1:2.

In accordance with the invention, the cerium oxide to zirconium oxide mass ratio in the cerium/zirconium/rare earth metal mixed oxides of layers A and/or B can vary within wide limits. It amounts to, for example, 0.1 to 1.5, preferably 0.2 to 1.25 or 0.3 to 1.

In embodiments of the present invention, coating A comprises a first and a second oxygen storage component, wherein the first oxygen storage component has a higher zirconium oxide content than the second oxygen storage component. It is furthermore preferred for the first oxygen storage component to have a cerium oxide to zirconium oxide weight ratio of 0.7 to 0.1, which is smaller than in the second cerium/zirconium/rare earth metal mixed oxide, which has a cerium oxide to zirconium oxide weight ratio of 0.5 to 1.5. Other more preferred embodiments include a first oxygen storage component having a cerium oxide to zirconium oxide weight ratio of 0.6 to 0.2 and a second oxygen storage component having a cerium oxide to zirconium oxide weight ratio of 0.6 to 1.2. Still other most preferred embodiments include a first oxygen storage component having a cerium oxide to zirconium oxide weight ratio of 0.5 to 0.3, and the second oxygen storage component has a cerium oxide to zirconium oxide weight ratio of 0.7 to 1.0.

In a preferred embodiment, the three-way catalytic converter according to the invention is designed such that in coating A, the first cerium/zirconium/rare earth metal mixed oxide has a cerium oxide content of 10% to 40% based on the weight of the first cerium/zirconium/rare earth metal mixed oxide, more preferably of 15% to 35% and very particularly preferably of 20% to 30% based on the weight of the first cerium/zirconium/rare earth metal mixed oxide.

In contrast, the zirconium oxide content in coating A in the first cerium/zirconium/rare earth metal mixed oxide is 40% to 90% based on the weight of the first cerium/zirconium/rare earth metal mixed oxide. It is advantageous if the zirconium oxide content in the first cerium/zirconium/rare earth metal mixed oxide is between 50% and 75%, very preferably 55% to 65%, based on the weight of the first cerium/zirconium/rare earth metal mixed oxide.

Likewise, a cerium oxide content of 25% to 60% based on the weight of the second cerium/zirconium/rare earth metal mixed oxide should prevail in the second cerium/zirconium/rare earth metal mixed oxide of coating A. It is more advantageous if in the second cerium/zirconium/rare earth metal mixed oxide, there is a cerium oxide content of 30% to 55%, very preferably 35% to 50%, based on the weight of the second cerium/zirconium/rare earth metal mixed oxide.

In a further preferred embodiment, the second cerium/zirconium/rare earth metal mixed oxide in coating A has a zirconium oxide content of 20% to 70% based on the weight of the second cerium/zirconium/rare earth metal mixed oxide. It is more preferred here if the second cerium/zirconium/rare earth metal mixed oxide has a zirconium oxide content of 30% to 60% and very particularly preferably of 40% to 55%, based on the weight of the second cerium/zirconium/rare earth metal mixed oxide.

It is preferred according to the invention if both cerium/zirconium/rare earth metal mixed oxides of layer A and optionally also the at least one cerium/zirconium/rare earth metal mixed oxide of layer B are doped with lanthanum oxide so that preferably the lanthanum oxide content is >0% to 10% based on the weight of cerium/zirconium/rare earth metal mixed oxide. Particularly advantageously, these lanthanum oxide-containing oxygen storage components have a lanthanum oxide to cerium oxide mass ratio of 0.05 to 0.5.

The first cerium/zirconium/rare earth metal mixed oxide in layer A is preferably doped with yttrium oxide in addition to lanthanum oxide. A preferred catalytic converter has an yttrium oxide content in the first cerium/zirconium/rare earth metal mixed oxide of 2% to 25% based on the weight of the first cerium/zirconium/rare earth metal mixed oxide. More preferably, the yttrium content of the first cerium/zirconium/rare earth metal mixed oxide is between 4% and 20%, very preferably 10% to 15%, based on the weight of the first cerium/zirconium/rare earth metal mixed oxide.

An embodiment in which the second cerium/zirconium/rare earth metal mixed oxide of layer A is doped not only with lanthanum oxide but also with a further metal oxide from the group of rare earth metal oxides, preferably with praseodymium, is also advantageous. The content of the second rare earth metal in the second cerium/zirconium/rare earth metal mixed oxide may be between 2% and 15% based on the weight of the second cerium/zirconium/rare earth metal mixed oxide. It is more advantageous if the content of the second rare earth metal of the second cerium/zirconium/rare earth metal mixed oxide is 3% to 10%, very preferably 4% to 8%, based on the weight of the second cerium/zirconium/rare earth metal mixed oxide.

An embodiment in which the cerium/zirconium/rare earth metal mixed oxide of coating B is doped not only with lanthanum oxide but also with a further metal oxide from the group of rare earth metal oxides, preferably with praseodymium oxide and/or yttrium oxide, is also advantageous. The content of the rare earth metal in the cerium/zirconium/rare earth metal mixed oxide of coating B may be between 2% and 15% based on the weight of the cerium/zirconium/rare earth metal mixed oxide. It is more advantageous if the content of the rare earth metal of the cerium/zirconium/rare earth metal mixed oxide is 3% to 10%, very preferably 4% to 8%, based on the weight of the cerium/zirconium/rare earth metal mixed oxide in layer B.

In coating A and/or B, the praseodymium content of the second oxygen storage component is in particular 2 to 10% by weight based on the weight of the respective oxygen storage component. The lanthanum oxide to praseodymium oxide weight ratio is in particular 0.1 to 2.0, preferably 0.2 to 1.8 and very preferably 0.5 to 1.5.

In embodiments of the present invention, in the coating, the zirconium oxide content of the yttrium oxide-containing oxygen storage component is greater than the zirconium oxide content of the praseodymium oxide-containing oxygen storage component, in each case based on the respective oxygen storage component.

According to the invention, coatings A and B contain precious metals as catalytically active elements. Layer A and layer B, independently of each other, contain as platinum group metal, in particular, platinum, palladium, rhodium, or mixtures of at least two of the same, preferably from at least two of these platinum group metals. In embodiments of the present invention, layer A contains platinum, palladium, or platinum and palladium, and layer B contains palladium, rhodium, or palladium and rhodium.

In particular, layer A contains palladium, and layer B contains rhodium, or palladium and rhodium.

The precious metals are usually used in amounts of 0.1 g/l to 15 g/l, based on the volume of the ceramic honeycomb body, preferably 0.15 g/l to 10 g/l. In a preferred embodiment, the precious metals are present in equal measure both on the aluminum oxide and on the oxygen storage components.

As substrate materials for the precious metals in layer A and B, all materials known to the person skilled in the art can be considered for this purpose. Such materials are in particular metal oxides with a BET surface area of 30 to 250 $m^2/g$, preferably 100 to 200 $m^2/g$ (determined according to DIN 66132—latest version as of filing date). Cerium/zirconium/rare earth metal mixed oxides may serve as support materials for the platinum group metals in layer A and/or in layer B. Furthermore, in layer A and/or in layer B, they can also be supported wholly or in part on active aluminum oxide. Therefore, in embodiments of the present invention, layer A and layer B contain active aluminum oxide. It is particularly preferable for the active aluminum oxide to be stabilized by means of doping, in particular with lanthanum oxide. Preferred active aluminum oxides contain 1 to 6% by weight, in particular 3 to 4% by weight, lanthanum oxide ($La_2O_3$).

The term, "active aluminum oxide," is known to the person skilled in the art. It particularly describes γ aluminum oxide with a surface area of 100 to 200 $m^2/g$. Active aluminum oxide is frequently described in the literature and is commercially available.

Coating A and/or B usually comprise oxygen storage components in amounts of 30 to 225 g/l, based on the volume of the honeycomb body, preferably 40 to 200 g/l and particularly preferably 50 to 160 g/l.

The mass ratio of support materials and oxygen storage components in the coating is usually preferably 0.2 to 1.5, for example 0.3 to 0.8.

In embodiments of the present invention, the coatings A and B contain one or more alkaline earth compounds, such as strontium oxide, barium oxide or barium sulfate. The amount of barium sulfate per coating is, in particular, 2 to 20 g/l volume of the support.

Coating A contains, in particular, strontium oxide or barium oxide.

In further embodiments of the present invention, the coatings A and B contain additives, such as rare earth compounds, for example lanthanum oxide, and/or binders, such as aluminum compounds. These additives are used in quantities that can vary within wide limits and that the person skilled in the art can determine in the specific case by simple means.

Honeycomb bodies which are made from ceramic or metal and which have a volume V and parallel flow channels for the exhaust gases of the combustion engine are suitable as catalytically inert catalyst supports. According to the invention, the catalytically active coating is located on the walls in the channels of a flow substrate. Ceramic honeycomb bodies which can be used according to the present invention are known flow substrates and obtainable on the market. They consist, for example, of silicon carbide, aluminum titanate or cordierite and, for example, have a cell density of 200 to 900 cells per square inch (cpsi) and usually a wall thickness of between 2 and 12 mil, or 0.051 and 0.305 mm. Honeycomb bodies that can be used in accordance with the present invention are known and available on the market.

According to the present invention, the coating extends from one end of the ceramic honeycomb body over at least 50% of the length L of the substrate. The loading of the substrate with the catalytic coatings is in total 100 g/l to 350 g/l based on the volume of the support, preferably 125 g/l to 300 g/l and particularly preferably 150 g/l to 280 g/l.

In embodiments of the present invention, the coatings A and B contain no zeolite and no molecular sieve.

In a further embodiment of the present invention, layer A lies directly on the inert catalyst support, i.e., there is no additional layer or no undercoat between the inert catalyst support and layer A.

In a further embodiment of the present invention, layer B is in direct contact with the exhaust gas stream, i.e., there is no additional layer or no overcoat on layer B.

The catalytic converter according to the invention can be produced by methods known to the person skilled in the art, for example by applying a coating suspension, which is usually referred to as washcoat, to the honeycomb body by means of one of the usual dip coating methods or pump and suction coating methods. Thermal post-treatment or calcination usually follow.

According to the invention, the wall surfaces of the flow channels of the substrate are coated with the two catalyst layers A and B. In order to coat the catalyst support with layer A, the solids provided for this layer are suspended in water and the catalyst support is coated with the coating suspension that is thus obtained. The process is repeated with a coating suspension, in which the solids that are provided for layer B are suspended in water. Preferably, both layer A and layer B are coated along the entire length of the inert catalyst support. This means that layer B completely covers layer A, and, as a result, only layer B comes into direct contact with the exhaust gas stream.

It is known to the person skilled in the art that the average particle size of the catalytically active materials has to be matched to the particular ceramic substrate. In embodiments of the present invention, the coating suspensions for producing the coating are ground to a particle size distribution of $d_{50}=2$ to 8 μm, preferably 3 to 7 μm and particularly preferably 4 to 6 μm and of $d_{90}=7$ to 25 μm, preferably 8 to 23 μm and particularly preferably 9 to 20 μm (average particle size $d_{50}$ and $d_{90}$ respectively of the Q3 distribution [https://de.wikipedia.org/wiki/Partikelgr% C3% B6% C3%9Fenverteilung] according to DIN 66160—latest version as of filing date).

The catalytic converter according to the invention is perfectly suitable for removing carbon monoxide, hydrocarbons and nitrogen oxides out of the exhaust gas of combustion engines operated with stoichiometric air-fuel mixture, in particular in vehicles with intake manifold injection.

The present invention thus also relates to a method for removing carbon monoxide, hydrocarbons and nitrogen oxides out of the exhaust gas of combustion engines operated with stoichiometric air-fuel mixture, characterized in that the exhaust gas is passed over a catalytic converter according to the invention.

The invention claimed is:

1. Catalytic converter for removing carbon monoxide, hydrocarbons and nitrogen oxides out of the exhaust gas of combustion engines operated with stoichiometric air-fuel mixture, comprising a ceramic flow substrate of length L and at least two catalytic coatings A and B, wherein
   a layer A contains at least one active aluminum oxide, one platinum group metal, and at least two different cerium/zirconium/rare earth metal mixed oxides, and
   a layer B applied to layer A contains at least one active aluminum oxide, a platinum group metal, and at least one cerium/zirconium/rare earth metal mixed oxide, and the first cerium/zirconium/rare earth metal mixed oxide in coating A has a weight ratio of cerium oxide to zirconium oxide of 0.7 to 0.1, which is smaller than in the second cerium/zirconium/rare earth metal mixed oxide in coating A, which has a weight ratio of cerium oxide to zirconium oxide of 0.5 to 1.5 and the first cerium/zirconium/rare earth metal mixed oxide in coating A is doped with yttrium oxide in addition to lanthanum oxide.

2. Catalytic converter according to claim 1, characterized in that
   coating A is located on the walls of the substrate and extends from one end of the substrate over at least 50% of the length L.

3. Catalytic converter according to claim 1, characterized in that
   the weight ratio of aluminum oxide to the sum of the two cerium/zirconium/rare earth metal mixed oxides in coating A is in the range from 10:90 to 60:40.

4. Catalytic converter according to claim 1, characterized in that
   the weight ratio of the first cerium/zirconium/rare earth metal mixed oxide to the second cerium/zirconium/rare earth metal mixed oxide in coating A is in the range from 4:1 to 1:4.

5. Catalytic converter according to claim 1, characterized in that
   the first cerium/zirconium/rare earth metal mixed oxide in coating A has a higher zirconium oxide content than the second cerium/zirconium/rare earth metal mixed oxide.

6. Catalytic converter according to claim 1, characterized in that
   the first cerium/zirconium/rare earth metal mixed oxide in coating A has a cerium oxide content of 10% to 40% based on the weight of the first cerium/zirconium/rare earth metal mixed oxide.

7. Catalytic converter according to claim 1, characterized in that
   the first cerium/zirconium/rare earth metal mixed oxide in coating A has a zirconium oxide content of 40% to 90% based on the weight of the first cerium/zirconium/rare earth metal mixed oxide.

8. Catalytic converter according to claim 1, characterized in that
   the second cerium/zirconium/rare earth metal mixed oxide in coating A has a cerium oxide content of 25% to 60% based on the weight of the second cerium/zirconium/rare earth metal mixed oxide.

9. Catalytic converter according to claim 1, characterized in that
   the second cerium/zirconium/rare earth metal mixed oxide in coating A has a zirconium oxide content of 20% to 70% based on the weight of the second cerium/zirconium/rare earth metal mixed oxide.

10. Catalytic converter according to claim 1, characterized in that
    both cerium/zirconium/rare earth metal mixed oxides in coating A are doped with lanthanum oxide.

11. Catalytic converter according to claim 1, characterized in that
    the lanthanum oxide content is >0% to 10% based on the weight of the respective cerium/zirconium/rare earth metal mixed oxide.

12. Catalytic converter according to claim 1, characterized in that
    the second cerium/zirconium/rare earth metal mixed oxide in coating A is doped not only with lanthanum oxide but also with a further metal oxide from the group of rare earth metal oxides.

13. Catalytic converter according to claim 12, characterized in that
   the second cerium/zirconium/rare earth metal mixed oxide in coating A is doped not only with lanthanum oxide but also with praseodymium.

14. Catalytic converter according to claim 1, characterized in that
   the cerium/zirconium/rare earth metal mixed oxide in coating B is doped with yttrium oxide and/or praseodymium oxide in addition to lanthanum oxide.

15. Catalytic converter according to claim 1, characterized in that
   the platinum group metal in layer A comprises at least one of platinum, palladium, or rhodium.

16. Catalytic converter according to claim 15, characterized in that
   the platinum group metal in layer B comprises at least one of platinum, palladium, or rhodium.

17. Catalytic converter according to claim 1, characterized in that
   the platinum group metal in layer B comprises at least one of platinum, palladium, or rhodium.

18. Method for removing carbon monoxide, hydrocarbons and nitrogen oxides out of the exhaust gas of combustion engines operated with stoichiometric air-fuel mixture, characterized in that
   the exhaust gas is conducted through a catalytic converter in accordance with claim 1.

\* \* \* \* \*